United States Patent [19]
Groves

[11] Patent Number: 5,992,837
[45] Date of Patent: Nov. 30, 1999

[54] WORKPIECE HOLDING ASSEMBLY

[75] Inventor: Marshall Dwaine Groves, 310 Mallory Ct., Jonesboro, Ark. 72401

[73] Assignees: Marshall Dwaine Groves, Jonesboro, Ark.; Jearl D. Brown, Dexter, Mo.

[21] Appl. No.: 09/016,771

[22] Filed: Jan. 30, 1998

[51] Int. Cl.[6] ........................................ B25B 1/24
[52] U.S. Cl. ................................................ 269/258
[58] Field of Search .................................. 269/258, 261, 269/262, 266

[56] References Cited

U.S. PATENT DOCUMENTS

| | | | |
|---|---|---|---|
| 4,632,375 | 12/1986 | Yang | 269/258 |
| 4,732,373 | 3/1988 | Yang | 269/258 |
| 4,767,110 | 8/1988 | Yang | 269/261 |
| 5,799,933 | 9/1998 | Yang | 269/261 |

*Primary Examiner*—David A. Scherbel
*Assistant Examiner*—Daniel G. Shanley
*Attorney, Agent, or Firm*—Haverstock, Garrett & Roberts

[57] ABSTRACT

A workpiece holding assembly includes a base member which has a first support portion extending therefrom at a first position, a second support portion extending therefrom at a second position, a third support portion extending therefrom at a third position, and a fourth support portion extending therefrom at a fourth position. A first workpiece engaging member extends between the first support portion and the second support portion and is adapted for at least partial rotational movement. A second workpiece engaging member extends between the third support portion and the fourth support portion and is adapted for at least partial rotational movement. Each workpiece engaging member may include an outer surface having at least one substantially planar surface portion and at least one curved surface portion. The second workpiece engaging member may run substantially parallel to the first workpiece engaging member. Pairs or other multiples of such holding assemblies may be utilized for engaging and holding a rokpiece.

28 Claims, 11 Drawing Sheets

WORKPIECE HOLDING ASSEMBLY

FIELD OF THE INVENTION

This invention relates generally to the field of workpiece holding devices, and more particularly, to a workpiece holding assembly including workpiece engaging members adapted for securely holding workpieces of various configurations and sizes.

BACKGROUND

In the machining industry, when a piece of stock or a workpiece is being machined, it is desirable to securely hold the workpiece so as to prevent unwanted movement thereof during the machining operation. One approach commonly taken is to utilize any one of a variety of vise type devices for holding workpieces. Such vise devices typically include one or more jaws which can be adjusted to engage the outer surfaces of the workpiece. Often in the machining environment, it is necessary to utilize the same machine tool for machining workpieces of various configurations, that is, workpieces having different cross-sectional shapes. In the past, some vise type devices utilized for holding workpieces have allowed for the jaw or jaws to be removed in order to accommodate holding of workpieces having various configurations. In particular, it is not uncommon to use multiple sets of jaws, each set being machined to specifically hold a workpiece of a certain configuration. One set of jaws is placed on the vise type device at a time in order to hold a workpiece having a configuration which corresponds thereto. If the same vice needs to be used for holding a workpiece of a different configuration the solution is to remove the set of vise jaws currently being used and to replace the removed set with a different set of vise jaws. This type of change out operation is time consuming and therefore costly in that it reduces productivity.

An alternative to changing out jaws is to use a jaw which does not necessarily match any one of the workpiece configurations. However, this can sometimes result in inadequate holding forces, and thus workpiece movement during the machining operation, resulting in defective end products. Even where specially machined jaws are used, it is possible that some workpieces may not exactly fit the jaw. For example, a jaw might be machined having planar surfaces intersecting at an angle of 90 degrees in order to hold a workpiece of rectangular cross-section. It is possible that some workpieces may not be exactly rectangular, that is, the corners thereof may not form precise right angles. In such cases the machined jaws are unable to compensate for such variations and the effective holding power of the jaws is adversely affected with respect to such imperfect workpieces.

Further, many of the aforementioned problems arise in workpiece holding applications in which a device other than a vice is used. It would therefore be desirable to provide a workpiece holding assembly which can be adapted for inclusion in a large number of types of holding devices, and which can be scaled for use in holding both small and large workpieces.

Accordingly, the present invention is directed to overcoming one or more of the problems as set forth above.

SUMMARY OF THE INVENTION

In one aspect of the present invention, a workpiece holding assembly for use in engaging and holding a workpiece is provided. A base member has a first support portion extending therefrom at a first position, a second support portion extending therefrom at a second position, a third support portion extending therefrom at a third position, and a fourth support portion extending therefrom at a fourth position. A first workpiece engaging member extends between the first support portion and the second support portion and is adapted for at least partial rotational movement. A second workpiece engaging member extends between the third support portion and the fourth support portion and is adapted for at least partial rotational movement. Each workpiece engaging member may include an outer surface having at least one substantially planar surface portion and at least one curved surface portion. The second workpiece engaging member may run substantially parallel to the first workpiece engaging member.

It is recognized that the exact configuration of the base member will vary according to the construction of the workpiece holding device in which the holding assembly is to be incorporated. Such a base member could be configured for placement in a vise, a chuck, a c-clamp, or other type holding device. The base member could also be configured for placement in the jaws of a gripping device such as a vise-grip. Further, in some applications it is recognized that the base member may be formed integral with the workpiece holding device. It is further recognized that the holding assembly of the present invention can be scaled to almost any size, thus providing a multitude of applications for such holding assembly.

DETAILED DESCRIPTION OF THE DRAWINGS

Figures 1, 2, 3:
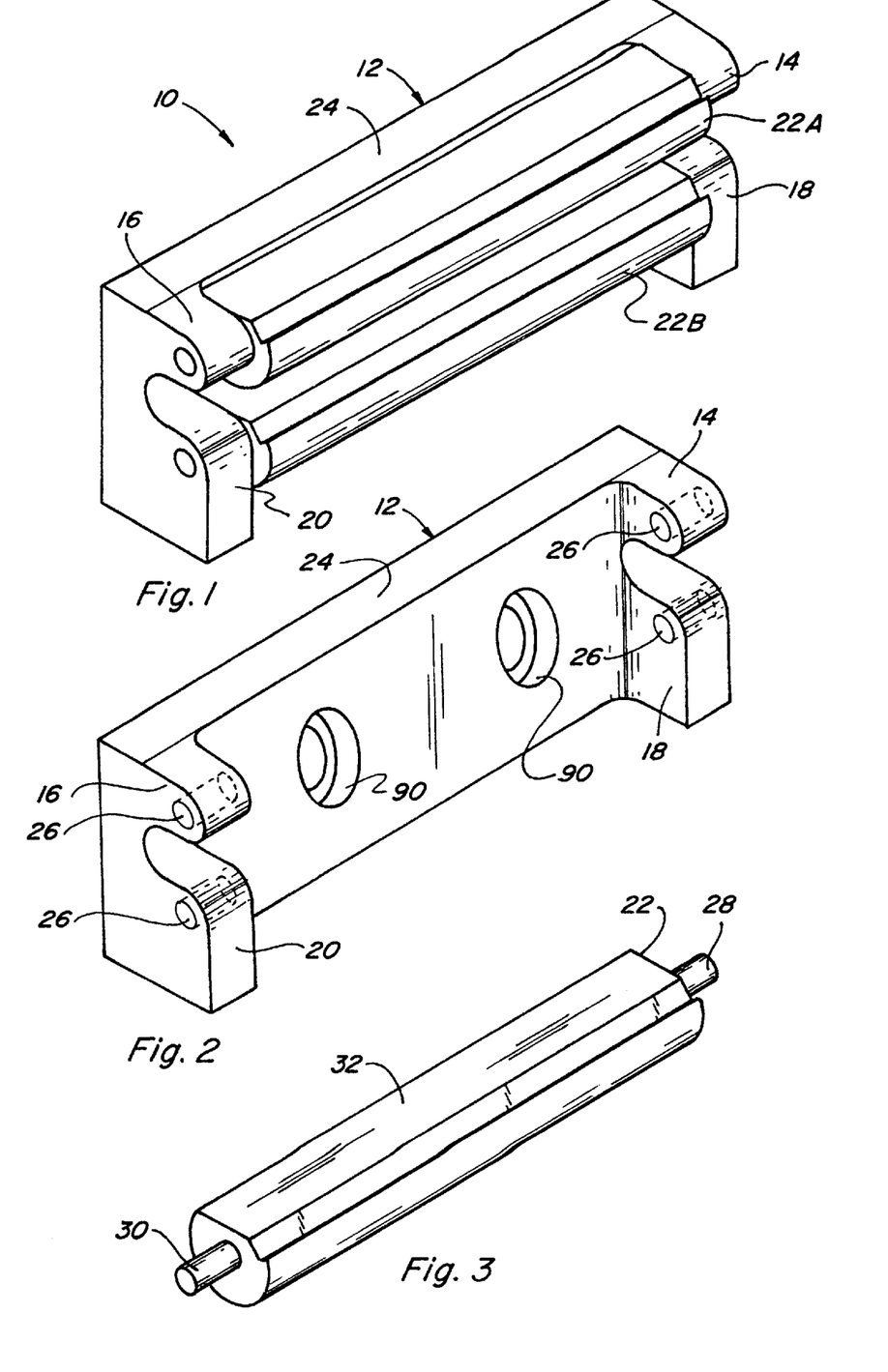
FIG. 1 is a perspective view of a workpiece holding assembly in accordance with one embodiment of the present invention.
FIG. 2 is a perspective view of the base member of FIG. 1.
FIG. 3 is a perspective view of a workpiece engaging member in accordance with FIG. 1.

Referring now to FIGS. 1–3, a workpiece holding assembly 10 is shown in FIG. 1 including a base member 12 having a support portion 14 extending therefrom, a support portion 16 extending therefrom, a support portion 18 extending therefrom and a support portion 20 extending therefrom. Base member 12 may be formed from a relatively hard metal material and respective support portions 14, 16, 18, and 20 may be formed integral therewith. A first workpiece engaging member 22A extends between support portion 14 and support portion 16 and a workpiece engaging member 22B extends between support portion 18 and support portion 20. Each workpiece engaging member should preferably be adapted for at least some rotational movement. In this regard, sufficient clearance between the outer surface of each workpiece engaging member and the portion 24 of base member 12 should be provided. It is preferred that the support portions be arranged to allow workpiece engaging member 22A to run substantially parallel to workpiece engaging member 22B.

As shown in FIG. 2, base member 12 may includes recesses or openings 26 in each of respective support portions 14, 16, 18 , and 20, opening 26 of support portion 14 being aligned with opening 26 of support portion 16, and opening 26 of support portion 18 being aligned with opening 26 of support portion 20. Each workpiece engaging member 22 may be configured as shown in FIG. 3, including stud portions 28 and 30 extending from respective ends thereof. Such stud portions 28 and 30 may be spring loaded within cavities or openings at the ends of the workpiece engaging member 22 to allow for easy installation into base member 12. Stud portions 28 and 30 may be formed small enough to be inserted within openings 26 so as to support each workpiece engaging member 22A and 22B between appropriate support portions of base member 12, and to allow rotational movement of each workpiece engaging member. It is recognized that full or partial rotation of each workpiece engaging member 22A and 22B may be provided. Openings 26 could be through openings, but it is also recognized that they need not be through openings in all applications.

It is also recognized that stud portions 28 and 30 could be formed integral with central portion 32 of workpiece engaging member in which case an alternative means for assembling the workpiece engaging members 22 with base member 12 could be provided. For example, in such case at least one support portion of each pair or set of support portions 14, 16 and 18, 20 could be formed separate from portion 24 of base member 12 so as to be attachable thereto by bolts, screws or other attachment means (not shown). In this type of assembly the workpiece engaging members 22A and 22B could be positioned within the assembly at the time that the separately formed support portions are attached to portion 24 of base member 12.

Figures 4, 5, 6:
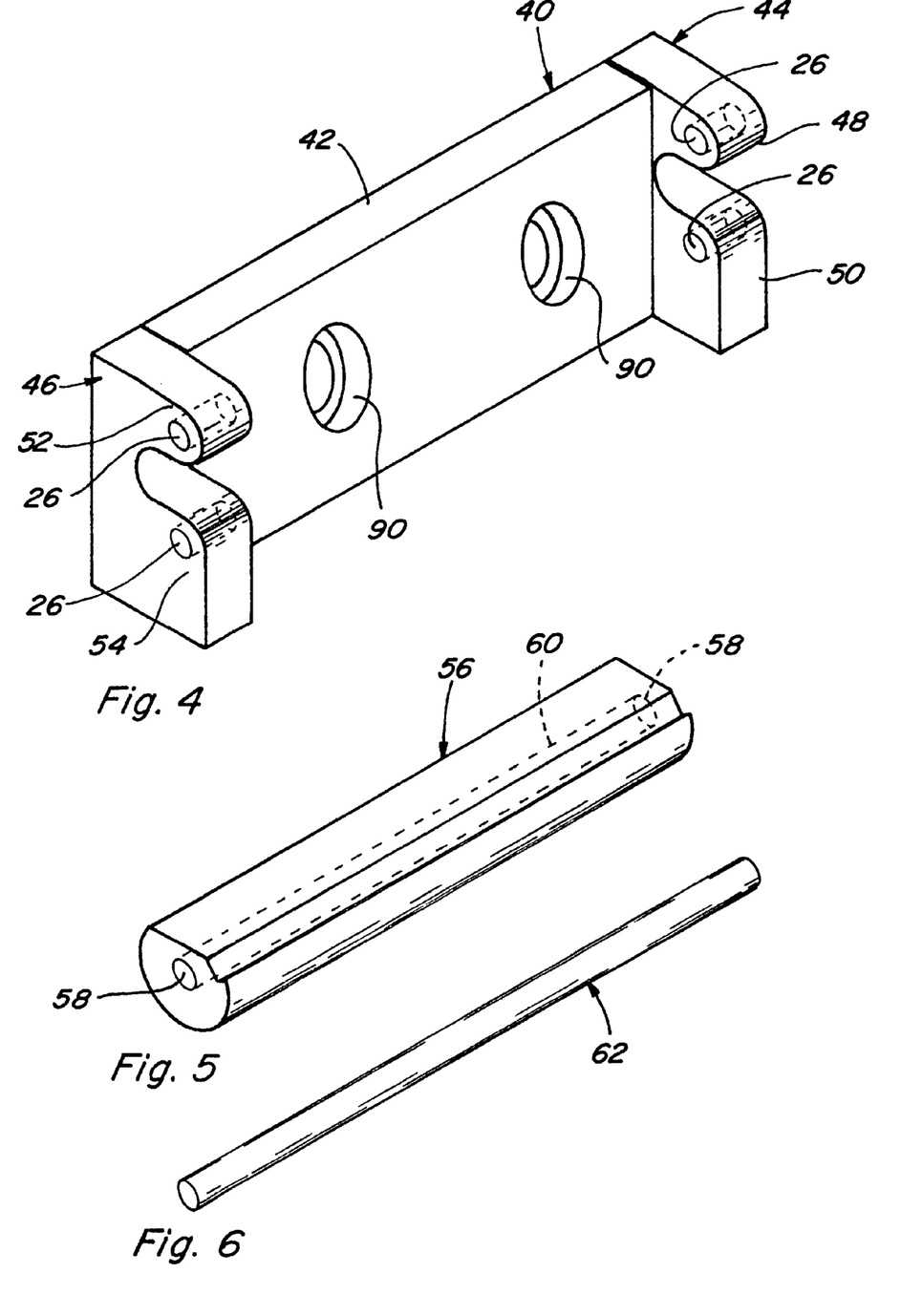
FIG. 4 is a perspective view of an alternative embodiment of a base member.
FIG. 5 is a perspective view of an alternative embodiment of a workpiece engaging member.
FIG. 6 is a perspective view of a shaft for use in supporting the workpiece engaging member of FIG. 5.

Referring now to FIG. 4, an alternative embodiment of a base member 40 is shown including portion 42 and end plates 44 and 46. Each end plate may be attached to portion 42 by bolts, screws, or other attachments means, including by being welded thereto. End plate 44 includes support portions 48 and 50 and end plate 46 includes support portions 52 and 54, each support portion including an opening 26 as described above. An alternative embodiment of a workpiece engaging member 56 is shown in FIG. 5. Unlike workpiece engaging member 22, member 56 includes no stud portions extending from the ends thereof. Rather, workpiece engaging member 56 includes recesses or openings 58 in each end thereof and such openings may extend through workpiece engaging member 56 to form a through channel 60 thereof. With regard to workpiece engaging member 56, a rod or shaft 62 such as shown in FIG. 6 may be utilized for supporting such member between support portions of either base member 12 or 40, the shaft 62 extending between aligned openings 26 and workpiece engaging member 56 being mounted thereon. It is recognized that shaft 62 should include an outer diameter which is small enough to allow such shaft 62 to be positioned within openings 26 and channel 60. Shaft 62 could be secured within an assembly utilizing, for example, locking pins or e-rings (not shown) positioned near the ends thereof.

Figure 7:
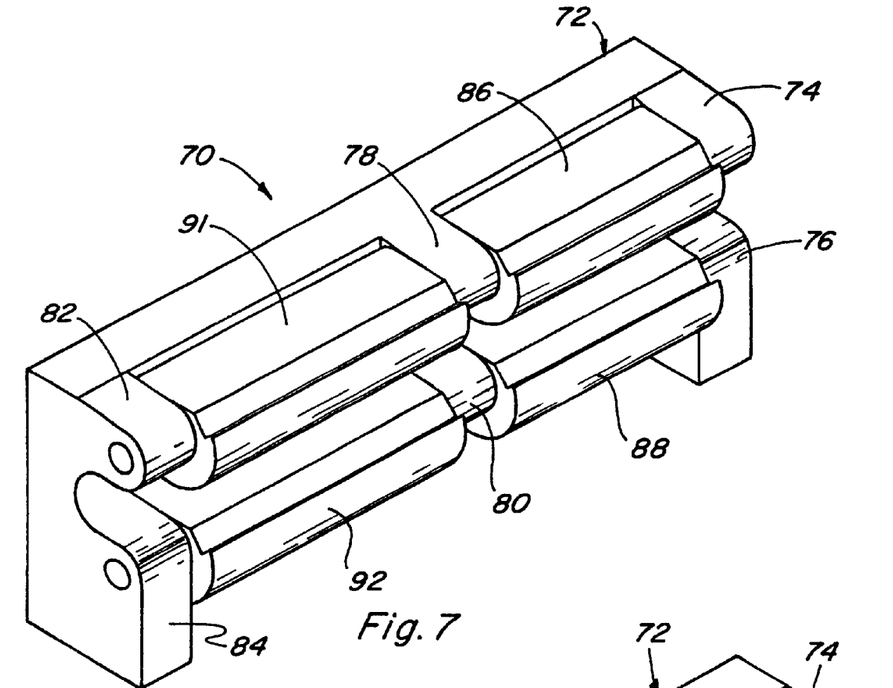
FIG. 7 is a perspective view of an alternative embodiment of a workpiece holding assembly in accordance with the present invention.
Figure 8:
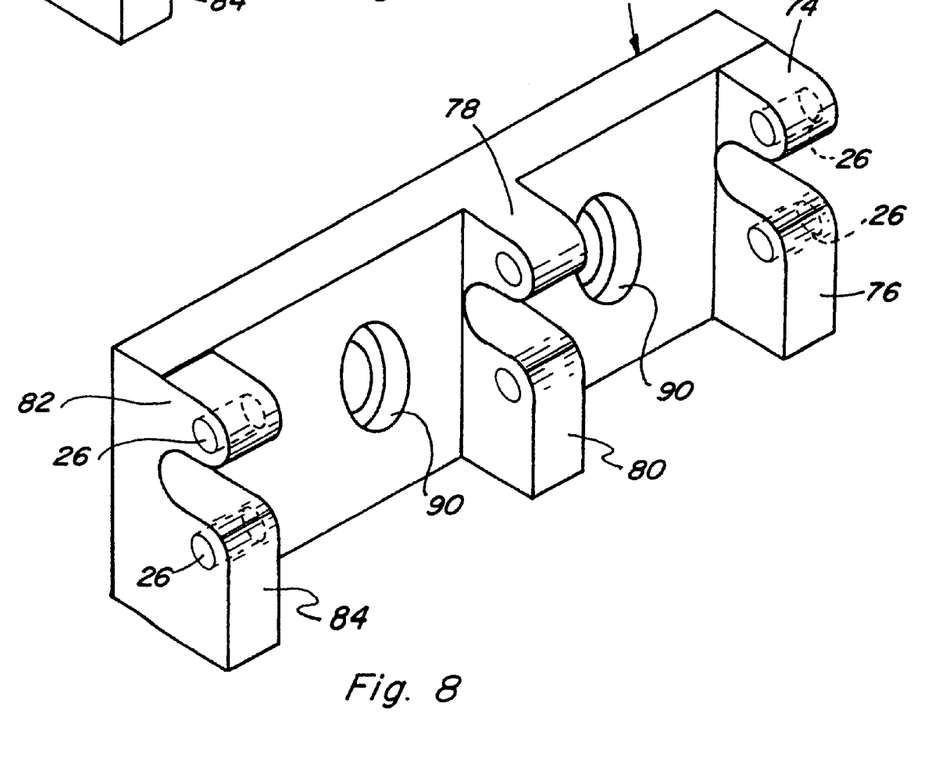
FIG. 8 is a perspective view of the base member of FIG. 7.

Referring to FIGS. 7 and 8, an alternative embodiment of a workpiece holding assembly 70 in accordance with the present invention is shown and includes base member 72 and support portions 74, 76, 78, 80, 82, and 84. Workpiece engaging members 86, 88, 90, and 92 extend between aligned support portions as shown, members 86 and 90 being substantially aligned and members 88 and 92 being substantially aligned. Workpiece engaging members 86, 88, 90, and 92 could be of either type 22 as shown in FIG. 3 or of the type 56 shown in FIG. 5. The advantage of an assembly as shown in FIG. 7 would be to provide additional support for the workpiece engaging members. In other words, for a given end to end length of a particular assembly, the construction provided in FIG. 7 could likely provide more clamping or holding force when engaged with a workpiece because the shorter workpiece engaging members utilized therein would not be as subject to lengthwise deformation such as bowing under the holding force. Further, the holding forces would be distributed to eight workpiece engaging member ends and six support portions in assembly 70 as opposed to four workpiece engaging member ends and four support portions in an assembly such as 10.

A workpiece holding assembly in accordance with the present invention could be incorporated into a variety of applications. By way of example, reference is made to FIG. 9 which shows a locking vise 100. Assemblies 10 and 70 could be incorporated therein by way utilizing bolts, screws, or other know attachment means. In this regard, referring to each of FIGS. 2, 4, and 8, openings 90 are provided for enabling such attachment. It is also recognized that the base members could be formed integrally with such a locking vise, or other holding device. In such a locking vise 100 one assembly would be positioned at location 102 and one assembly at location 104, rotation of handle 106 providing adjustment of the distance between the two assemblies.

Various holding configurations are depicted by the end views of FIGS. 10–21 which variety of holding configurations illustrate the utility of the present invention. Each configuration shows an end view of two assemblies 110 positioned to engage and hold a workpiece 112A–112J (shown in cross-section), such as would be enabled by positioning such assemblies on locking vise 100. The locking vise or other workpiece holding device into which the assemblies 110 might be positioned is not shown. In each of such depictions it is recognized that the assemblies 110 and workpiece engaging members 114 thereof could be constructed in accordance with any of the embodiments described above.

Figure 15:
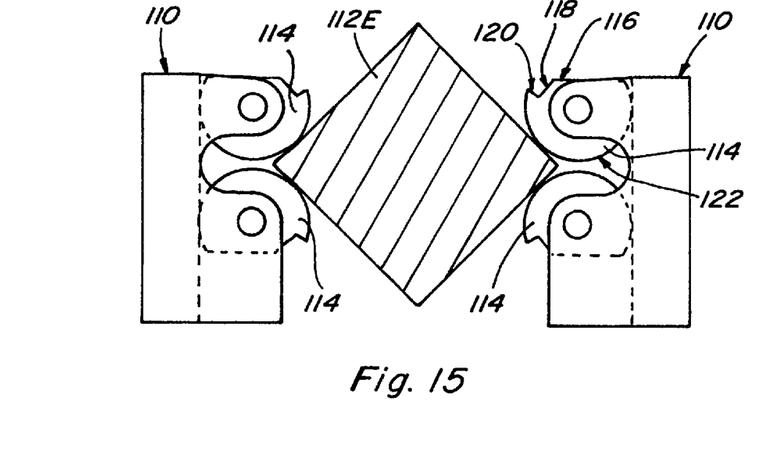
Figure 16:
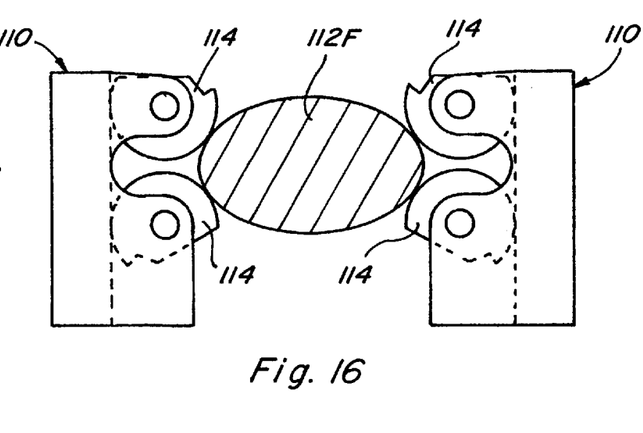
Figure 17:
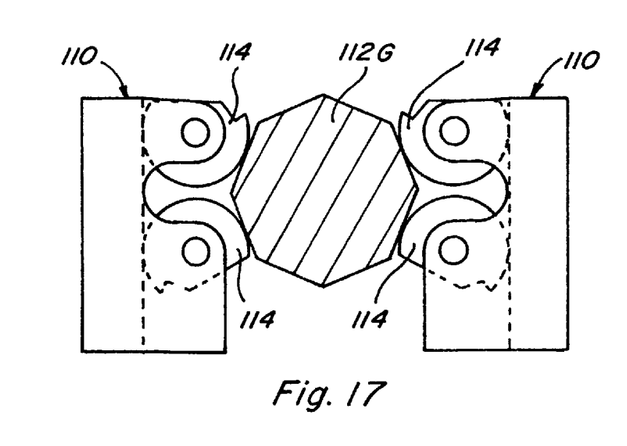
Figure 18:
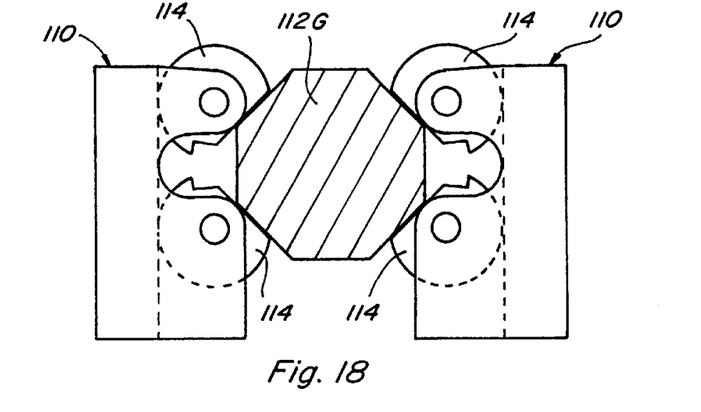
Figure 19:
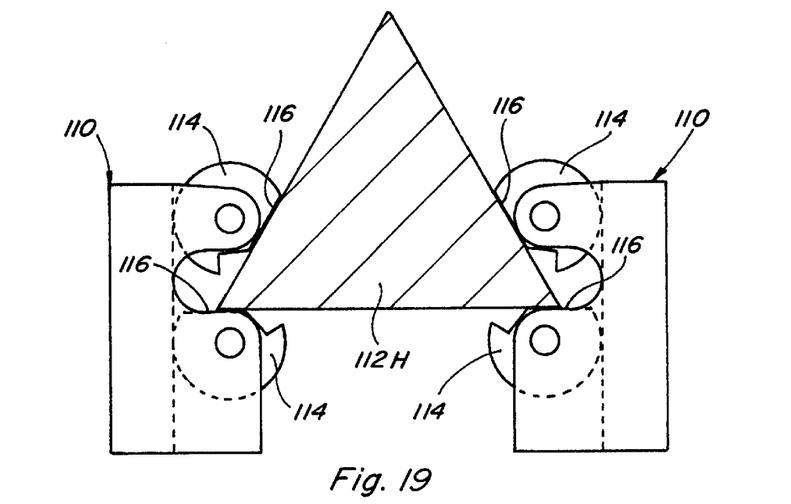
Figure 20:
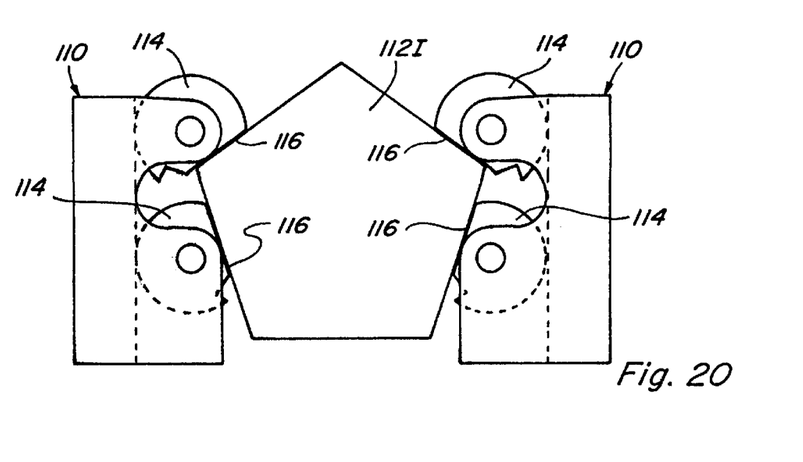
Figure 21:
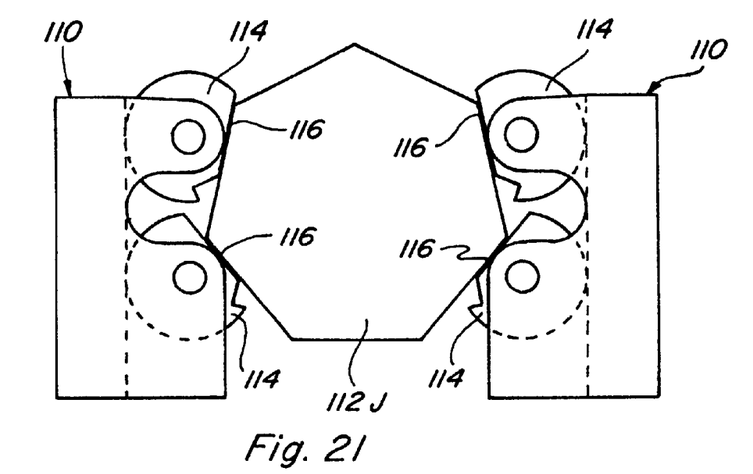

As best shown in FIG. 15, it is contemplated that each workpiece engaging member 114 preferably has an outer surface including substantially planar surface portions 116, 118, 120 and a curved surface portion 122. Substantially planar portion 118 extends from an edge of substantially planar portion 116 and is angled with respect thereto, and preferably at an obtuse angle with respect thereto. Substantially planar portion 120 extends from an edge of substantially planar portion 118, the two portions 118 and 120 preferably forming a right angle. Curved portion 122 extends from an edge of substantially planar portion 120 to an edge of substantially planar portion 116, and such curved portion may be substantially cylindrical in shape. However, it is also recognized that the outer surface of the workpiece engaging members could vary without adversely affecting many of the advantages realized by the present invention. For example, the outer surface might include only one curved surface portion and only one substantially planar surface portion.

Figure 10:
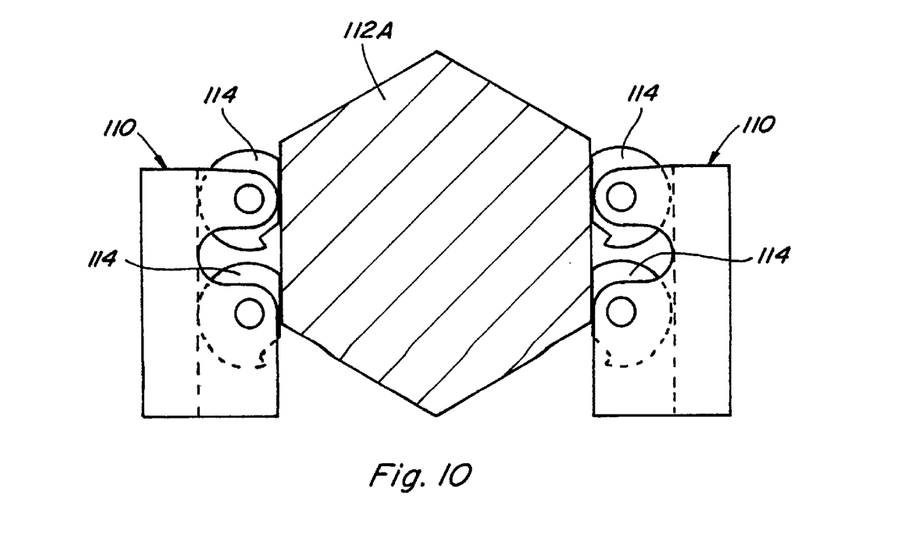
FIGS. 10–21 are end views of various holding configurations achievable by holding assemblies in accordance with the present invention.
Figure 11:
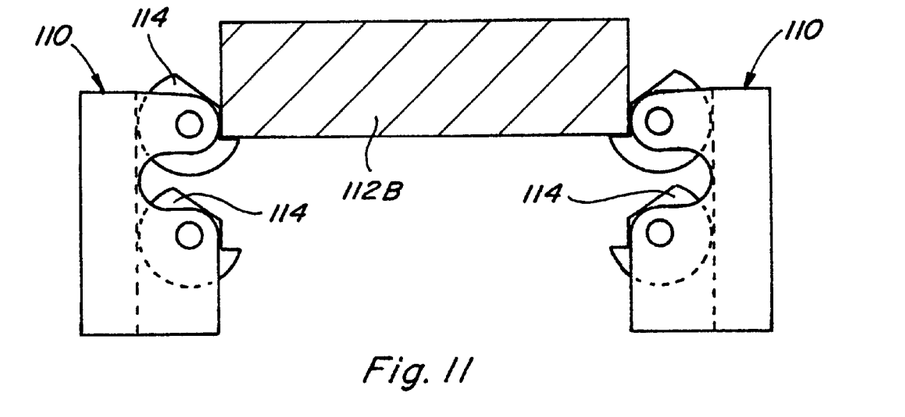
Figure 12:
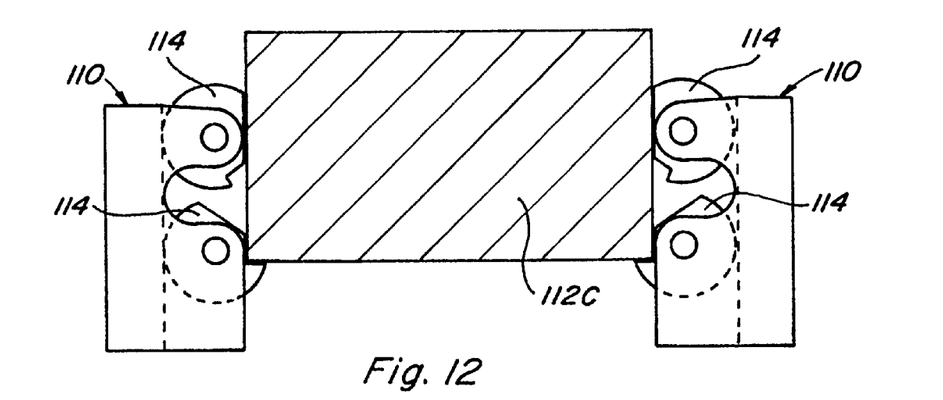
Figure 13:
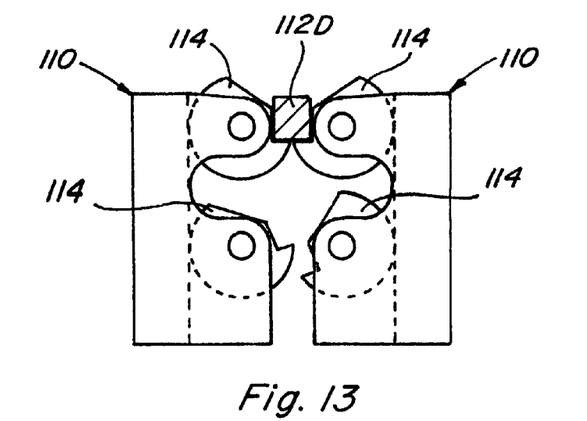

Referring to FIG. 10, it is seen that the assemblies can be utilized as a typical jaw of an ordinary vise by clamping only with the planar surfaces. The right angle formed by surface portions 118 and 120 can be utilized as shown in FIGS. 11, 12, and 13 to eliminate the need for using parallel bars.

Figure 14:
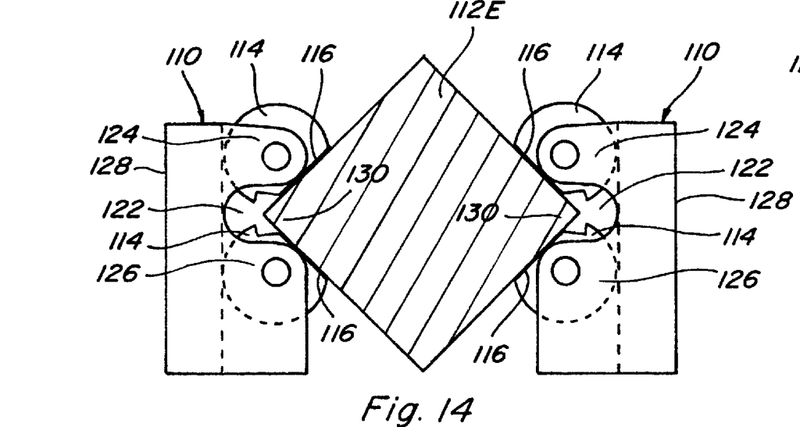

The need for v-blocks or b-blocks can be eliminated as shown in the configurations of FIGS. 14 and 15. Also particularly notable with respect to FIG. 14 is the spacing 122 provided between adjacent support portions 124 and 126 of the base members 128. Such spacing can be selected as needed for the desired application an need only be sufficient to allow portions 130 of the workpiece 112E being held to extend inward between the workpiece engaging members 114 where necessary. In certain application such spacing 122 may not be required at all. The rotatability of the workpiece engaging members 114 also provides for automatic adjustments to variations or differences between workpieces. For example, if the angle formed at workpiece portions 130 was not a right angle, through rotation the workpiece engaging members 114 would adjust such that substantially planar surface portions 116 still made surface to surface contact with the workpiece 112E. This advantage applies to many of the other holding configurations as well. In many of the holding configurations, including FIGS. 19–21, the flat surface portions 116 of the workpiece engaging members 114 will provide superior holding power by providing enabling more surface area to engage the workpiece, particularly with irregularly shaped workpieces.

Figure 9:
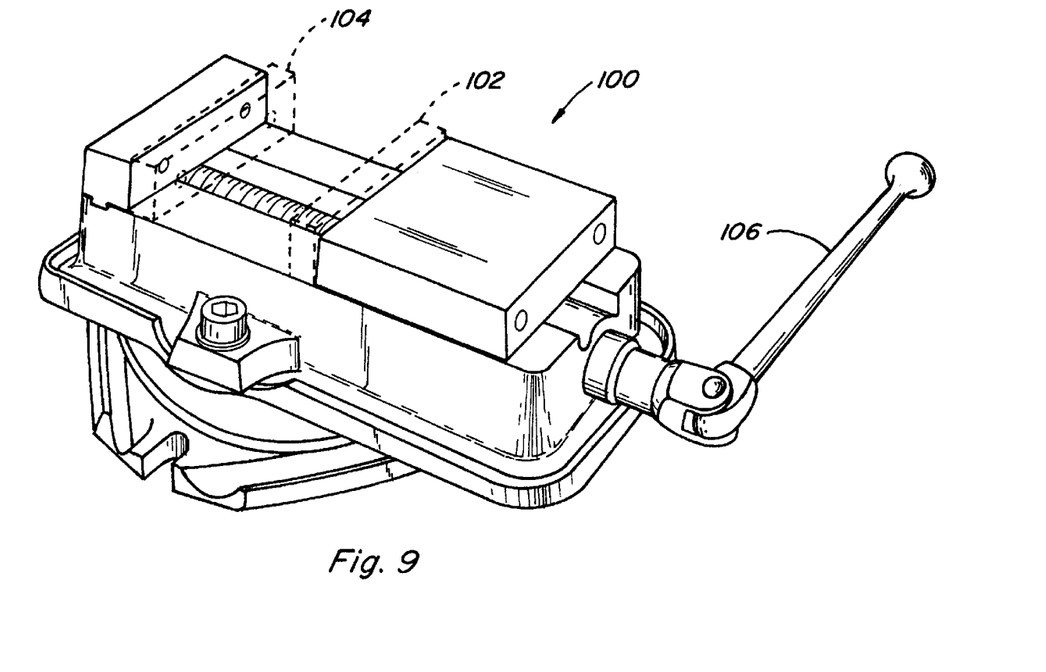
FIG. 9 is a perspective view of a locking vise.
Figure 22:
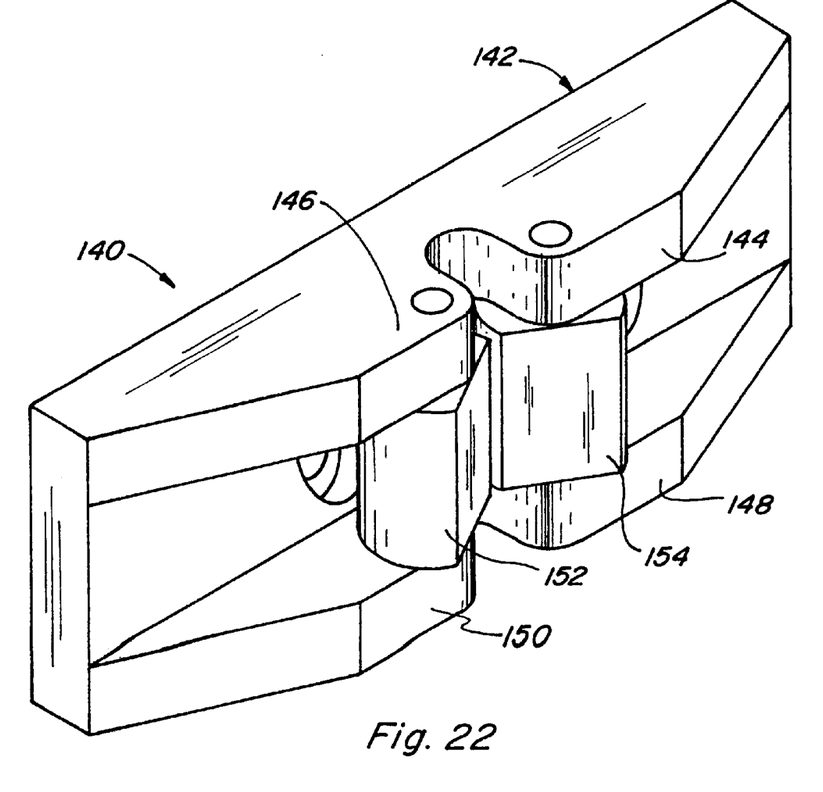
FIG. 22 is a perspective view of an alternative embodiment of a holding assembly.
Figure 23:
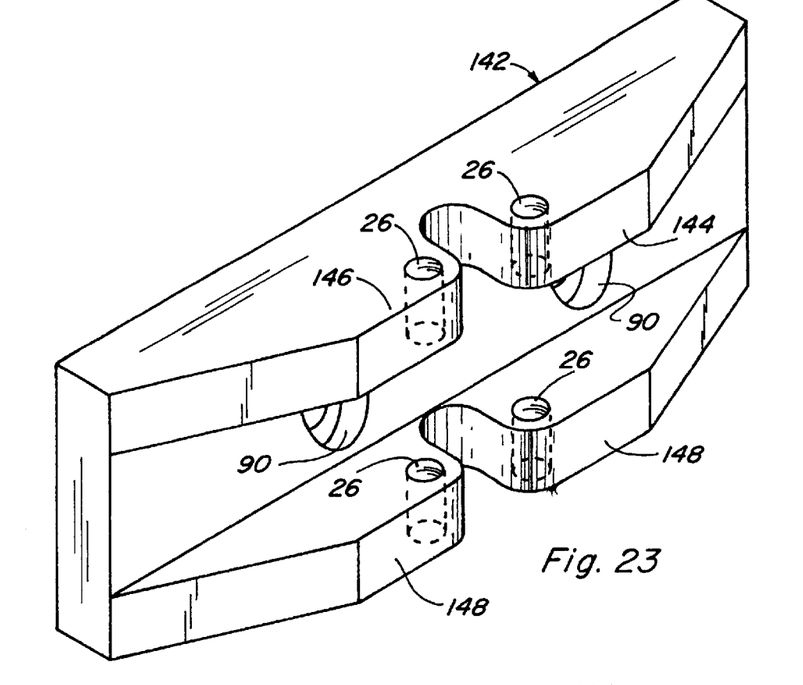
FIG. 23 is a perspective view of the base member of the holding assembly of FIG. 21.

With respect locking vise 100 shown in FIG. 9, the above-described assemblies would provide for holding workpieces horizontally in such vise. However, it is recognized that an assembly 140 such as that shown in FIGS. 22 and 23 could be utilized for holding workpieces vertically in such vise. Such assembly includes a base member 142 having support portions 144, 146, 148 and 150 with workpiece engaging members 152 and 154 extending therebetween in a vertical manner. Such workpiece engaging members may be constructed and positioned within the assembly as previously described.

Figure 24:
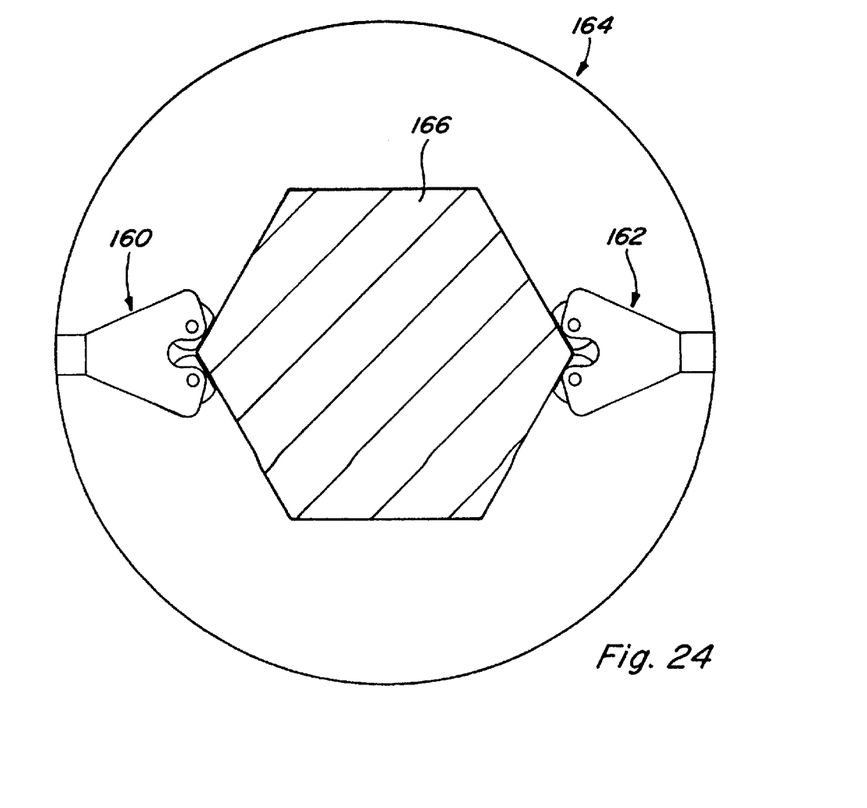
FIG. 24 shows two holding assemblies as incorporated in a two jaw scroll chuck.
Figure 25:
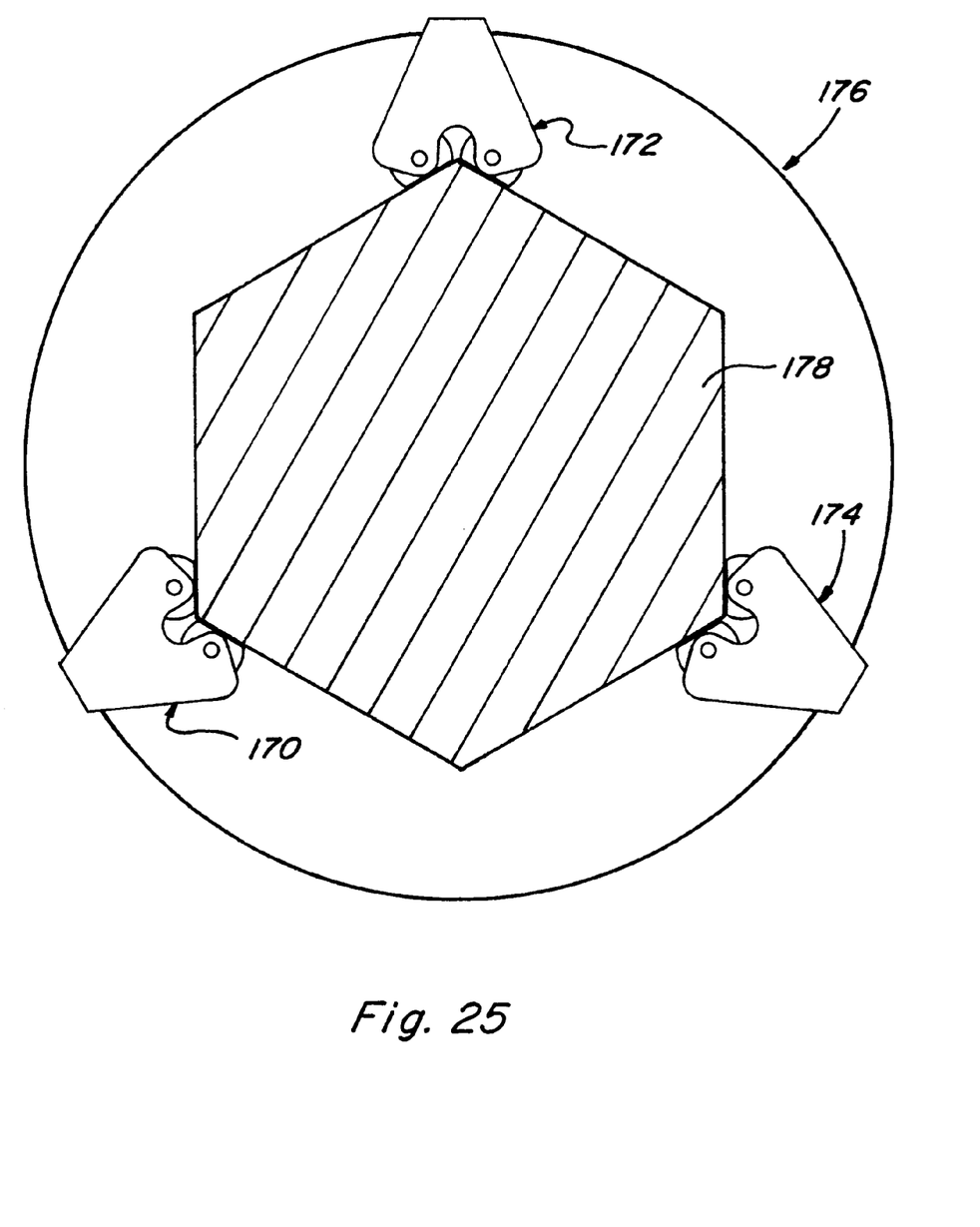
FIG. 25 shows three holding assemblies as incorporated in a three jaw self centering scroll chuck.
Figure 26:
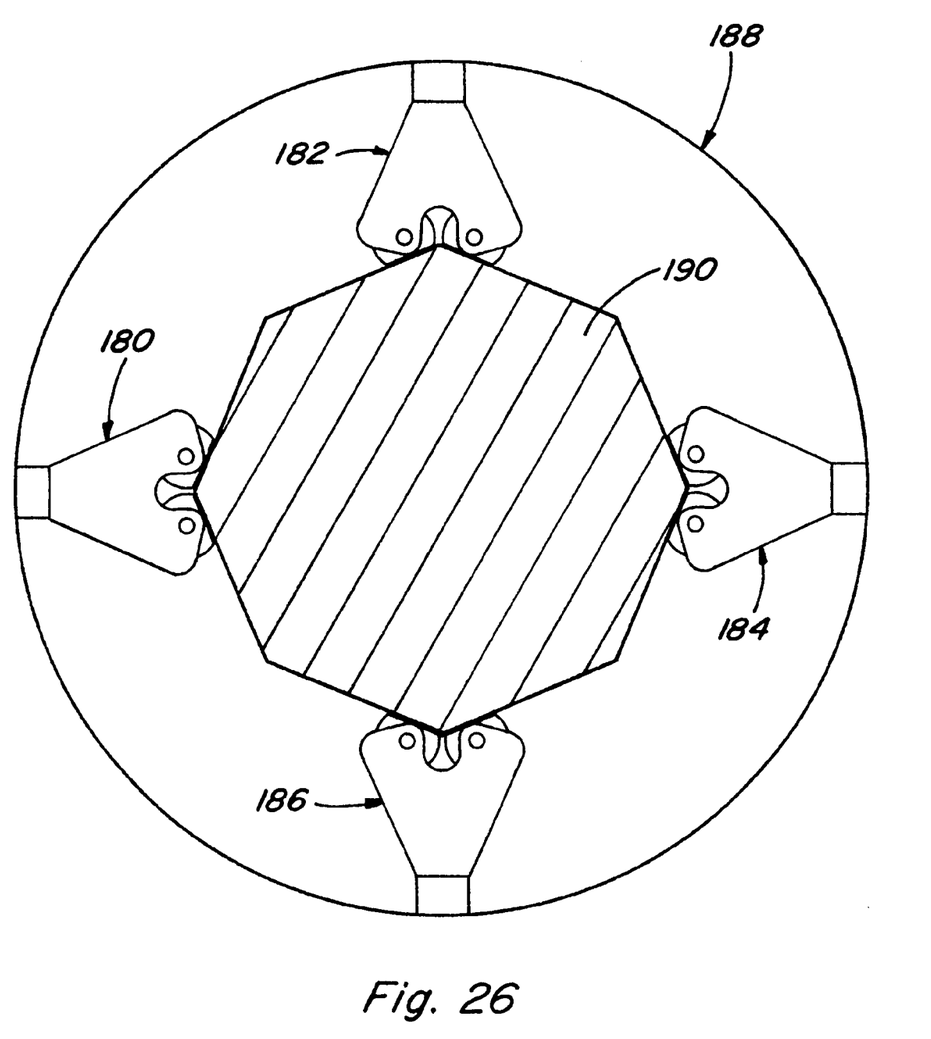
FIG. 26 shows four holding assemblies as incorporated in a four jaw independent or scroll chuck.

Although the present invention has been described largely with respect to use in a holding device such as a locking vise, it is recognized that the advantageous characteristics of the present invention can be incorporated into most any type of holding device. For example, reference is made to FIG. 24 which shows two assemblies 160 and 162, constructed in accordance with the present invention, in a representative use within a two jaw scroll chuck 164 for holding a workpiece 166. FIG. 25 shows three assemblies 170, 172, and 174 as used within a three jaw self centering scroll chuck 176 for holding a workpiece 178. FIG. 26 shows four assemblies 180, 182, 184, and 186 as used within a four jaw scroll or independent chuck 188 to hold a workpiece 190.

Based on the foregoing, it is apparent that the applications for holding assemblies constructed in accordance with the present invention are numerous. The exact configuration of a holding assembly, and particularly the base member, could be modified as necessary to fit within a particular holding device. It is also recognized that the scale of assemblies constructed in accordance with the present invention is limited only by manufacturing techniques and tools utilized. Still further, it is recognized that the base member utilized in a given holding assembly could be formed integrally with the workpiece holding device in which such holding assembly is utilized. It is also recognized that a holding assembly including only one workpiece engaging member would be useful when placed adjacent to another holding assembly including only one workpiece engaging member. In such a construction means could be provided for adjusting the spacing between adjacent assemblies so as to accommodate a variety of sizes of workpieces.

With respect to positioning of the workpiece engaging members to allow for at least partial rotational movement, it is recognized that a variety of techniques in addition to those described herein could be utilized. For example, the support portions of the base could themselves include inwardly extending studs which could be inserted within openings at the ends of the workpiece engaging members.

With respect to the positioning of the support portions and the length of workpiece engaging members, it is recognized that the distance between sets of support portions, such as 14, 16 and 18, 20 of FIG. 1, could be the same as shown. However, the distance between one set could be different than the distance between the other set, in which case workpiece engaging members of different lengths might be incorporated into the holding assembly.

I claim:

1. A workpiece holding assembly for a jaw of a vice or a chuck, comprising:

a base member having a first support portion extending therefrom at a first position, a second support portion extending therefrom at a second position, a third support portion extending therefrom at a third position, and a fourth support portion extending therefrom at a fourth position;

a first workpiece engaging member extending between and supported by the first support portion and the second support portion for at least partial rotational movement; and a second workpiece engaging member extending between and supported by the third support portion and the fourth support portion for at least partial rotational movement, the second workpiece engaging member running substantially parallel to the first workpiece engaging member.

2. The workpiece holding assembly, as set forth in claim 1, wherein each support portion includes an opening therein, the opening of the first support portion substantially aligned with the opening of the second support portion, and the opening of the third support portion substantially aligned with the opening of the fourth support portion.

3. The workpiece holding assembly, as set forth in claim 2, further comprising:

a first shaft member extending between the opening of the first support portion and the opening of the second support portion, a second shaft member extending between the opening of the third support portion and the opening of the fourth support portion, the first workpiece engaging member mounted on the first shaft member and the second workpiece engaging member mounted on the second shaft member.

4. The workpiece holding assembly, as set forth in claim 3, wherein the first workpiece engaging member includes an opening through which the first shaft member extends and the second workpiece engaging member includes an opening through which the second shaft member extends.

5. The workpiece holding assembly, as set forth in claim 2, wherein each of the openings is a through opening of the respective support portion.

6. The workpiece holding assembly, as set forth in claim 2, wherein each workpiece engaging member includes a first stud extending from a first end thereof and a second stud extending from a second end thereof, at least a portion of the first and second studs of each workpiece engaging member being positioned within one of the support portion openings.

7. The workpiece holding assembly, as set forth in claim 1, wherein a distance between the first position and the second position is about the same as a distance between the third position and the fourth position.

8. The workpiece holding assembly, as set forth in claim 1, wherein each support portion is formed integral with the base member.

9. The workpiece holding assembly, as set forth in claim 1, wherein the base member further includes a fifth support portion extending therefrom at a fifth position and a sixth support portion extending therefrom at a sixth position, the assembly further comprising:
   a third workpiece engaging member extending between the second support portion and the fifth support portion and adapted for at least partial rotational movement; and
   a fourth workpiece engaging member extending between the fourth support portion and the sixth support portion and adapted for at least partial rotational movement, the fourth workpiece engaging member running substantially parallel to the third workpiece engaging member.

10. The workpiece holding assembly, as set forth in claim 1, wherein each workpiece engaging member includes an outer surface having at least one substantially planar portion and at least one curved portion.

11. The workpiece holding assembly, as set forth in claim 10, wherein the outer surface of each workpiece engaging member includes a first substantially planar portion, a second substantially planar portion extending from a first edge of the first substantially planar portion and angled with respect thereto, and a third substantially planar portion extending from an edge of the second substantially planar portion and forming a right angle therewith.

12. The workpiece holding assembly, as set forth in claim 11, wherein the at least one curved portion of the outer surface of each workpiece engaging member extends from a second edge of the first substantially planar portion to an edge of the third substantially planar portion.

13. The workpiece holding assembly, as set forth in claim 11, wherein the first and second substantially planar surfaces form an obtuse angle.

14. The workpiece holding assembly, as set forth in claim 10, wherein the at least one curved portion of the outer surface of each workpiece engaging member is substantially cylindrical in shape.

15. A workpiece holding assembly, comprising:
   a workpiece engaging member adapted for at least partial rotational movement thereof, the workpiece engaging member including an outer work piece engaging surface having at least one substantially planar portion and at least one curved portion, the workpiece engaging member including a stud extending from a first end thereof and a stud extending from a second end thereof and wherein the outer surface of the workpiece engaging member includes a first substantially planar portion and a second substantially planar portion extending from an edge of the first substantially planar portion and forming a internal right angle therewith.

16. The workpiece holding assembly, as set forth in claim 15, wherein the outer surface of the workpiece engaging member includes a first substantially planar portion, a second substantially planar portion extending from a first edge of the first substantially planar portion and angled with respect thereto, and a third substantially planar portion extending from an edge of the second substantially planar portion and forming a right angle therewith.

17. The workpiece holding assembly, as set forth in claim 16, wherein the curved portion of the outer surface of the workpiece engaging member extends from a second edge of the first substantially planar portion to an edge of the third substantially planar portion.

18. The workpiece holding assembly, as set forth in claim 16, wherein the first and second substantially planar portions of the outer surface of the workpiece engaging member form an obtuse angle.

19. A holding assembly for a jaw of a vice or a chuck, comprising:
   a base member including a first support portion extending therefrom at a first position thereon and a second support portion extending therefrom at a second position thereon; and
   a first workpiece engaging member extending between the first support portion and the second support portion and adapted for at least partial rotational movement, the first workpiece engaging member including an outer surface having at least one substantially planar portion and at least one curved portion, the base member further including a third support portion extending therefrom at a third position thereon and a fourth support portion extending therefrom at a fourth position thereon, the assembly further comprising a second workpiece engaging member extending between the third support portion and the fourth support portion and adapted for at least partial rotational movement, the second workpiece engaging member including an outer surface having at least one substantially planar portion and at least one curved portion.

20. The holding assembly, as set forth in claim 19, wherein the first and second support portions are formed integral with the base portion.

21. The holding assembly, as set forth in claim 19, wherein the second workpiece engaging member runs substantially parallel to the first workpiece engaging member.

22. A workpiece holding assembly, comprising:
   a base member having a first support portion extending therefrom at a first position, a second support portion extending therefrom at a second position, a third support portion extending therefrom at a third position, and a fourth support portion extending therefrom at a fourth position;
   a first workpiece engaging member extending between the first support portion and the second support portion and adapted for at least partial rotational movement; and
   a second workpiece engaging member extending between the third support portion and the fourth support portion and adapted for at least partial rotational movement, the second workpiece engaging member running substantially parallel to the first workpiece engaging member, wherein each support portion includes an opening therein, the opening of the first support portion being substantially aligned with the opening of the second support portion, and the opening of the third support portion being substantially aligned with the opening of the fourth support portion.

23. The workpiece holding assembly as set forth in claim 22, further comprising:

a first shaft member extending between the opening of the first support portion and the opening of the second support portion, a second shaft member extending between the opening of the third support portion and the opening of the fourth support portion, the first workpiece engaging member being mounted on the first shaft member and the second workpiece engaging member being mounted on the second shaft member.

24. The workpiece holding assembly, as set forth in claim 23, wherein the first workpiece engaging member includes an opening through which the first shaft member extends and the second workpiece engaging member includes an opening through which the second shaft member extends.

25. The workpiece holding assembly, as set forth in claim 22, wherein each of the openings is a through opening of the respective support portion.

26. The workpiece holding assembly, as set forth in claim 22, wherein each workpiece engaging member includes a first stud extending from a first end thereof and a second stud extending from a second end thereof, at least a portion of the first and second studs of each workpiece engaging member being positioned within one of the support portion openings.

27. A workpiece holding assembly, comprising:

a base member having a first support portion extending therefrom at a first position, a second support portion extending therefrom at a second position, a third support portion extending therefrom at a third position, and a fourth support portion extending therefrom at a fourth position;

a first workpiece engaging member extending between the first support portion and the second support portion and adapted for at least partial rotational movement;

a second workpiece engaging member extending between the third support portion and the fourth support portion and adapted for at least partial rotational movement, the second workpiece engaging member running substantially parallel to the first workpiece engaging member, wherein the base member further includes a fifth support portion extending therefrom at a fifth position and a sixth support portion extending therefrom at a sixth position, the assembly further comprising:

a third workpiece engaging member extending between the second support portion and the fifth support portion and adapted for at least partial rotational movement; and a fourth workpiece engaging member extending between the fourth support portion and the sixth support portion and adapted for at least partial rotational movement, the forth workpiece engaging member running substantially parallel to the third workpiece engaging member.

28. A workpiece holding assembly, comprising:

a workpiece engaging member adapted for at least partial rotational movement thereof, the workpiece engaging member including an outer surface having at least one substantially planar portion and at least one curved portion, a first end having an opening therein and a second end having an opening therein, wherein the opening at the first end and the opening at the second end are substantially aligned and meet to form a through passage of the workpiece engaging member.

* * * * *